United States Patent
Lord et al.

(10) Patent No.: US 7,588,056 B2
(45) Date of Patent: Sep. 15, 2009

(54) METHODS AND SYSTEMS FOR ENHANCED FLUID TRANSPORT

(75) Inventors: David Lord, Quebec (CA); Richard Grey, Quebec (CA); David Demers, Quebec (CA); Joel Heraud, Quebec (CA); Maxime Lebel, Quebec (CA)

(73) Assignee: Ansul Canada Limited, Toronto, Ontario (CA)

( * ) Notice: Subject to any disclaimer, the term of this patent is extended or adjusted under 35 U.S.C. 154(b) by 435 days.

(21) Appl. No.: 11/325,186

(22) Filed: Jan. 4, 2006

(65) Prior Publication Data

US 2006/0201570 A1    Sep. 14, 2006

Related U.S. Application Data

(60) Provisional application No. 60/661,414, filed on Mar. 14, 2005.

(51) Int. Cl.
*F16L 11/00* (2006.01)

(52) U.S. Cl. .................. 138/124; 138/125; 138/137; 138/140; 138/119

(58) Field of Classification Search ......... 138/123–126, 138/110, 132, 137, 141, 140, 118
See application file for complete search history.

(56) References Cited

U.S. PATENT DOCUMENTS

| | | | | |
|---|---|---|---|---|
| 1,816,076 A | * | 7/1931 | Down .................. 188/367 |
| 3,578,028 A | * | 5/1971 | Roberts ................ 138/123 |
| 4,228,824 A | * | 10/1980 | Evans et al. ........... 138/119 |
| 4,553,023 A | | 11/1985 | Jameson et al. |
| 5,361,806 A | | 11/1994 | Lalikos et al. |
| 5,639,528 A | | 6/1997 | Feit et al. |
| 5,671,780 A | | 9/1997 | Kertesz |
| 2003/0178085 A1 | | 9/2003 | Burke et al. |
| 2004/0134555 A1 | | 7/2004 | Powell et al. |
| 2004/0261876 A1 | * | 12/2004 | Warren et al. ......... 138/125 |
| 2005/0059763 A1 | | 3/2005 | Beck |
| 2005/0059764 A1 | | 3/2005 | Beck |

FOREIGN PATENT DOCUMENTS

| | | |
|---|---|---|
| CA | 1134761 | 11/1982 |
| FR | 2723420 | 2/1996 |
| FR | 2857724 | 1/2005 |

* cited by examiner

*Primary Examiner*—Patrick F Brinson
(74) *Attorney, Agent, or Firm*—The Small Patent Law Group LLP

(57) ABSTRACT

Methods and systems for a flexible hose assembly are provided. The flexible hose assembly includes a core tube including a substantially fluid-impervious body including an inner surface and an outer surface, and an aramid sleeve including aramid yarn, the aramid sleeve circumferentially covering the core tube.

14 Claims, 4 Drawing Sheets

METHODS AND SYSTEMS FOR ENHANCED FLUID TRANSPORT

CROSS REFERENCE TO RELATED APPLICATIONS

This application claims priority to U.S. Provisional Application Ser. No. 60/661,414 filed Mar. 14, 2005, which is hereby incorporated by reference in its entirety.

BACKGROUND OF THE INVENTION

This invention relates generally to fluid transport systems and, more particularly, to high pressure fluid supply systems operable in harsh environments.

At least some known systems for transporting fluids use rigid pipe that is joined together in relatively short sections by couplings. Misalignment of the coupling flanges facilitates leakage of the fluid to the environment surrounding the couplings and reduces the amount of fluid available at the destination. Other known fluid transport systems use flexible conduits to transport the fluid. The flexible conduits are fabricated in longer sections than the rigid pipe. Couplings joining the flexible conduits are generally less prone to leakage because alignment of the coupling flanges is simpler to maintain, however the flexible conduits are not capable of transporting fluids at relatively high pressure and are more prone to puncture damage and abrasion than the rigid pipe.

BRIEF DESCRIPTION OF THE INVENTION

In one embodiment, a flexible hose assembly includes a core tube including a substantially fluid-impervious body including an inner surface and an outer surface, and an aramid sleeve including aramid yarn, the aramid sleeve circumferentially covering the core tube.

In another embodiment, a method of forming a conduit assembly for transporting high pressure fluids includes forming an elongate core tube including an inner surface and a radially outer surface wherein the core tube is formed from a substantially fluid-impervious material and circumferentially covering the core tube with at least one aramid sleeve wherein the aramid sleeve includes aramid yarn circumferentially surrounding the core tube.

In yet another embodiment, a flexible reinforced hose system includes a hose assembly and a clamping assembly. The hose assembly includes a core tube that includes a polyester reinforcing sleeve co-extruded with urethane, the core tube including an inner surface and a radially outer surface. The hose assembly also includes at least one aramid sleeve including aramid yarn, the aramid sleeve circumferentially covering the radially outer surface, and a polyester layer circumferentially covering the aramid sleeve. The polyester layer includes a topcoat configured to facilitate making the polyester layer substantially impervious to liquid intrusion and to ultraviolet light. The clamping assembly includes an inner coupling end including at least one of a circumferential ridge and a circumferential groove extending about an exterior surface of the inner coupling. The exterior surface is configured to couple to the inner surface. An outer sleeve end includes at least one of a circumferential ridge and a circumferential groove extending about an interior surface of the outer sleeve, the ridges and grooves are complementary to the ridges and grooves of the inner coupling sleeve. A clamp is configured to draw the inner coupling end and the outer sleeve end together when at least a portion of the hose assembly is positioned between the inner coupling end and the outer sleeve end such that the ridge and the groove form an interference fit with the portion of the hose assembly.

DETAILED DESCRIPTION OF THE INVENTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
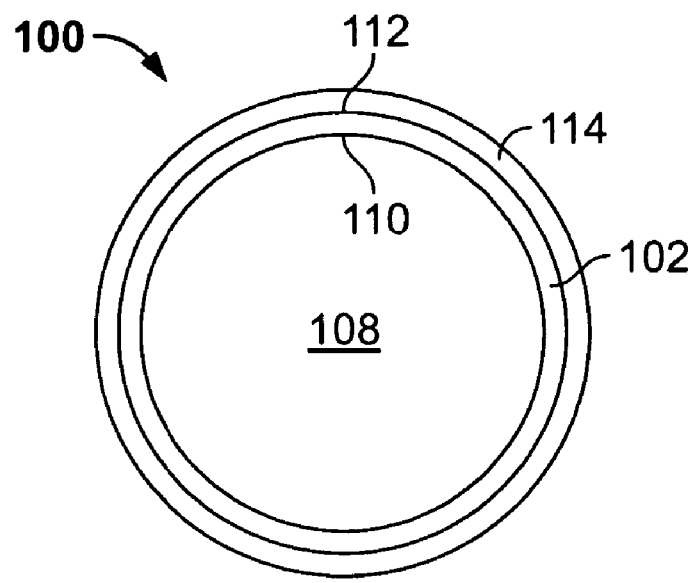
FIG. 1 is a cross-sectional view of an exemplary fluid transfer conduit 100 in accordance with an embodiment of the present invention.

FIG. 1 is a cross-sectional view of an exemplary fluid transfer conduit 100 in accordance with an embodiment of the present invention. Fluid transfer conduit or hose 100 includes a core tube 102 formed as an elongate cylindrical hose. In the exemplary embodiment, core tube 102 is configured to maintain a substantially flat cross-section when substantially empty of fluid within a central bore 108 of core tube 102 and a substantially circular cross-section when at least partially filled with a fluid. Optionally, core tube 102 is formed to maintain a circular or elliptical cross-section when empty. Core tube 102 is formed to include an inner surface 110 that has a coefficient of fluid friction substantially similar to smooth-bore pipe and a radially outer surface 112.

Core tube 102 is capable of resisting a predetermined pressure. An aramid sleeve 114 including aramid yarn arranged in interlocking engagement, such as by weaving, is position over core tube 102 circumferentially covering outer surface 112. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. The weave may be configured in various selectable mesh orientations. For example, the mesh may be substantially open wherein yarns or groups of yarns are spaced from adjacent yarns or groups of yarns, or the mesh may be substantially closed wherein yarns or groups of yarns are in contact or nearly in contact with adjacent yarns or groups of yarns. In various embodiments, polyester yarns are interweaved with the aramid yarns to pad the aramid yarns from abrading each other. The polyester yarn limits the contact made between adjacent aramid yarn strands. Sleeve 114 is sized such that an inner radius of sleeve 114 is substantially equal to an outer radius of core tube 102 when a predetermined amount of pressure is contained within core tube 102. In the exemplary embodiment, when core tube 102 contains fluid at approximately 500 psig, the outer diameter of core tube 102 is approximately equal to the inner diameter of sleeve 114. At such pressure an inner surface of sleeve 114 is fully engaged with outer surface 112 to facilitate limiting further radial expansion of core tube 102. Sleeve 114 provides reinforcement to permit a working pressure within core tube 102 of greater than 500 psig.

Figure 2:
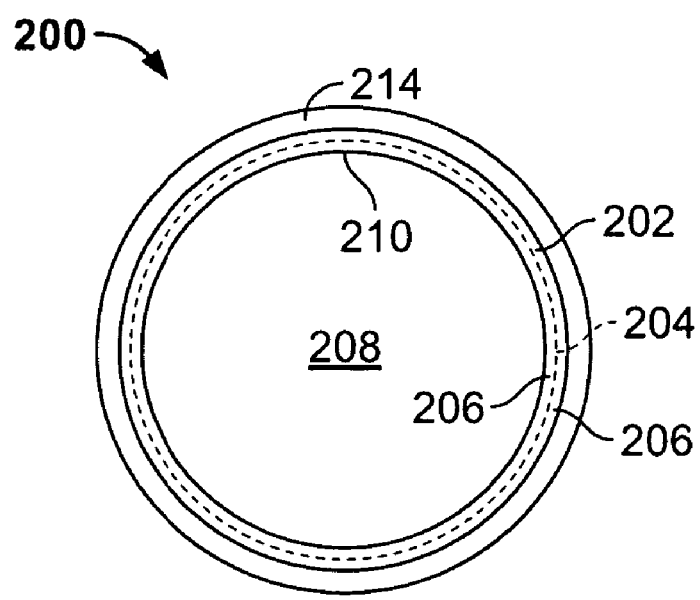
FIG. 2 is a cross-sectional view of an exemplary fluid transfer conduit in accordance with another embodiment of the present invention.

FIG. 2 is a cross-sectional view of an exemplary fluid transfer conduit 200 in accordance with another embodiment of the present invention. Fluid transfer conduit or hose 200 includes a core tube 202 that includes a woven polyester reinforcing sleeve 204 that is co-extruded with a material that is substantially impervious to fuels, such as hydrocarbon fuels, for example, urethane 206. Core tube 202 is formed as an elongate cylindrical hose configured to maintain a substantially flat cross-section when substantially empty of fluid within a central bore 208 of core tube 202 and a substantially circular cross-section when at least partially filled with a fluid. Optionally, core tube 202 is formed to maintain a circular or elliptical cross-section when empty. Core tube 202 is formed to include an inner surface 210 that has a coefficient of fluid friction substantially similar to smooth-bore pipe and a radially outer surface 212.

Core tube 202 is capable of resisting a pressure of up to approximately 500 psig without further reinforcement. A sleeve 214 including aramid yarn is positioned over core tube 202 to circumferentially cover core tube 202. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. In various embodiments, polyester yarns are interweaved with the aramid yarns to pad the aramid yarns from abrading each other. The polyester yarn limits the contact made between adjacent aramid yarn strands. Sleeve 214 is sized such that an inner radius of sleeve 214 is substantially equal to an outer radius of core tube 202 when a predetermined amount of pressure is contained within core tube 202. In the exemplary embodiment, when core tube 202 contains fluid at approximately 500 psig, the outer diameter of core tube 202 is approximately equal to the inner diameter of sleeve 214. At such pressure an inner surface of sleeve 214 is fully engaged with outer surface 212 to facilitate limiting further radial expansion of core tube 202. Sleeve 214 provides reinforcement to permit a working pressure within core tube 202 of greater than 500 psig.

Figure 3:
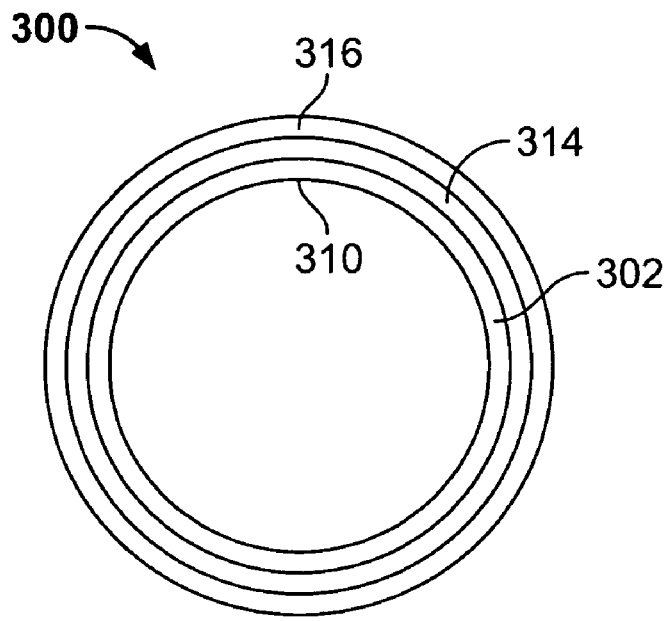
FIG. 3 is a cross-sectional view of an exemplary fluid transfer conduit in accordance with still another embodiment of the present invention.

FIG. 3 is a cross-sectional view of an exemplary fluid transfer conduit 300 in accordance with an embodiment of the present invention. Fluid transfer conduit or hose 300 includes a core tube 302 formed as an elongate cylindrical hose. In the exemplary embodiment, core tube 302 is configured to maintain a substantially flat cross-section when substantially empty of fluid within a central bore 308 of core tube 302 and a substantially circular cross-section when at least partially filled with a fluid. Optionally, core tube 302 is formed to maintain a circular or elliptical cross-section when empty. Core tube 302 is formed to include an inner surface 310 that has a coefficient of fluid friction substantially similar to smooth-bore pipe and a radially outer surface 312.

Core tube 302 is capable of resisting a predetermined pressure. An aramid sleeve 314 including aramid yarn arranged in interlocking engagement, such as by weaving, is position over core tube 302 circumferentially covering outer surface 312. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. The weave may be configured in various selectable mesh orientations. For example, the mesh may be substantially open wherein yarns or groups of yarns are spaced from adjacent yarns or groups of yarns, or the mesh may be substantially closed wherein yarns or groups of yarns are in contact or nearly in contact with adjacent yarns or groups of yarns. In various embodiments, polyester yarns are interweaved with the aramid yarns to pad the aramid yarns from abrading each other. The polyester yarn limits the contact made between adjacent aramid yarn strands. Sleeve 314 is sized such that an inner radius of sleeve 314 is substantially equal to an outer radius of core tube 302 when a predetermined amount of pressure is contained within core tube 302. In the exemplary embodiment, when core tube 302 contains fluid at approximately 500 psig, the outer diameter of core tube 302 is approximately equal to the inner diameter of sleeve 314. At such pressure an inner surface of sleeve 314 is fully engaged with outer surface 312 to facilitate limiting further radial expansion of core tube 302. Sleeve 314 provides reinforcement to permit a working pressure within core tube 302 of greater than 500 psig.

A second woven sleeve 316 also including aramid yarn is slid over sleeve 314. Second woven sleeve 316 at least partially covers sleeve 314. In the exemplary embodiment, the construction of sleeve 316 is substantially similar to the construction of sleeve 314. In an alternative embodiment, the construction of sleeve 316 is different than the construction of sleeve 314. Sleeve 316 is sized such that an inner radius of sleeve 316 is substantially equal to an outer radius of sleeve 314 when a predetermined amount of pressure is contained within core tube 302. In the exemplary embodiment, when core tube 302 contains fluid at approximately 500 psig, the outer diameter of sleeve 314 is approximately equal to the inner diameter of sleeve 316. At such pressure an inner surface of sleeve 316 is fully engaged with the outer surface of sleeve 314 to facilitate limiting further radial expansion of core tube 302. Sleeve 316 provides reinforcement to permit a working pressure within core tube 302 of greater than 500 psig.

Figure 4:
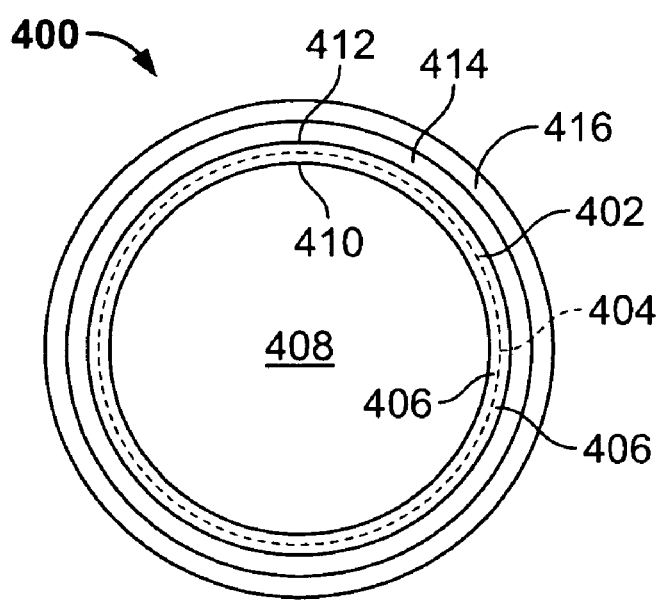
FIG. 4 is a cross-sectional view of an exemplary fluid transfer conduit in accordance with yet another embodiment of the present invention.

FIG. 4 is a cross-sectional view of an exemplary fluid transfer conduit 400 in accordance with another embodiment of the present invention. Fluid transfer conduit or hose 400 includes a core tube 402 that includes a woven polyester reinforcing sleeve 404 that is co-extruded with a material that is substantially impervious to fuels, such as hydrocarbon fuels, for example, urethane 406. Core tube 402 is formed as an elongate cylindrical hose configured to maintain a substantially flat cross-section when substantially empty of fluid within a central bore 408 of core tube 402 and a substantially circular cross-section when at least partially filled with a fluid. Optionally, core tube 402 is formed to maintain a circular or elliptical cross-section when empty. Core tube 402 is formed to include an inner surface 410 that has a coefficient of fluid friction substantially similar to smooth-bore pipe and a radially outer surface 412.

Core tube 402 is capable of resisting a pressure of up to approximately 500 psig without further reinforcement. An aramid sleeve 414 including aramid yarn arranged in interlocking engagement, such as by weaving, is position over core tube 402 circumferentially covering outer surface 412. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. The weave may be configured in various selectable mesh orientations. For example, the mesh may be substantially open wherein yarns or groups of yarns are spaced from adjacent yarns or groups of yarns, or the mesh may be substantially closed wherein yarns or groups of yarns are in contact or nearly in contact with adjacent yarns or groups of yarns. In various embodiments, polyester yarns are interweaved with the aramid yarns to pad the aramid yarns from abrading each other. The polyester yarn limits the contact made between adjacent aramid yarn strands. Sleeve 414 is sized such that an inner radius of sleeve 414 is substantially equal to an outer radius of core tube 402 when a predetermined amount of pressure is contained within core tube 402. In the exemplary embodiment, when core tube 402 contains fluid at approximately 500 psig, the outer diameter of core tube 402 is approximately equal to the inner diameter of sleeve 414. At such pressure an inner surface of sleeve 414 is fully engaged with outer surface 412 to facilitate limiting further radial expansion of core tube 402. Sleeve 414 provides reinforcement to permit a working pressure within core tube 402 of greater than 500 psig.

A second aramid sleeve 416 also including aramid yarn is positioned over sleeve 414. Second aramid sleeve 416 at least partially covers sleeve 414. In the exemplary embodiment, the construction of sleeve 416 is substantially similar to the construction of sleeve 414. In an alternative embodiment, the construction of sleeve 416 is different than the construction of sleeve 414. Sleeve 416 is sized such that an inner radius of sleeve 416 is substantially equal to an outer radius of sleeve 414 when a predetermined amount of pressure is contained within core tube 402. In the exemplary embodiment, when core tube 402 contains fluid at approximately 500 psig, the outer diameter of sleeve 414 is approximately equal to the inner diameter of sleeve 416. At such pressure an inner surface of sleeve 416 is fully engaged with the outer surface of sleeve 414 to facilitate limiting further radial expansion of core tube 402. Sleeve 416 provides reinforcement to permit a working pressure within core tube 402 of greater than 500 psig.

Figure 5:
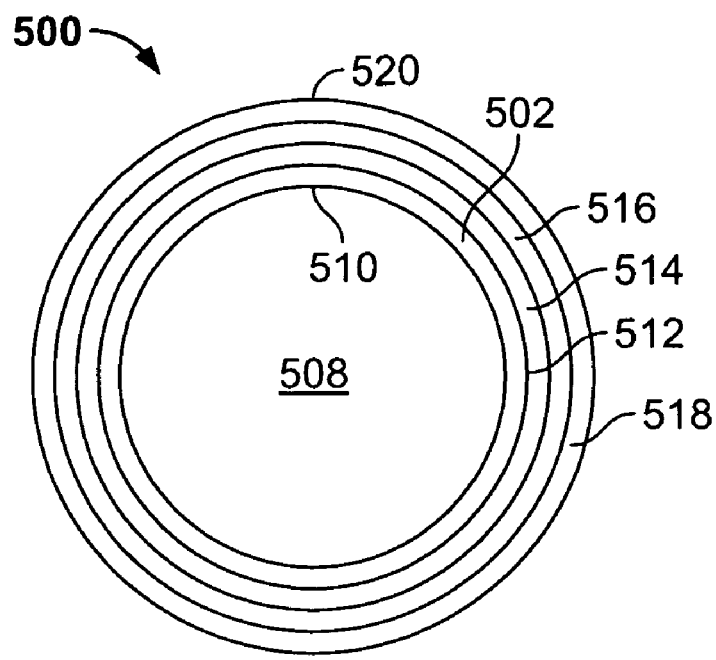
FIG. 5 is a cross-sectional view of an exemplary fluid transfer conduit in accordance with a further embodiment of the present invention.

FIG. 5 is a cross-sectional view of an exemplary fluid transfer conduit 500 in accordance with an embodiment of the present invention. Fluid transfer conduit or hose 500 includes a core tube 502 formed as an elongate cylindrical hose. In the exemplary embodiment, core tube 502 is configured to maintain a substantially flat cross-section when substantially empty of fluid within a central bore 508 of core tube 502 and a substantially circular cross-section when at least partially filled with a fluid. Optionally, core tube 502 is formed to maintain a circular or elliptical cross-section when empty. Core tube 502 is formed to include an inner surface 510 that has a coefficient of fluid friction substantially similar to smooth-bore pipe and a radially outer surface 512.

Core tube 502 is capable of resisting a predetermined pressure. An aramid sleeve 514 including aramid yarn arranged in interlocking engagement, such as by weaving, is positioned over core tube 502 circumferentially covering outer surface 512. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. The weave may be configured in various selectable mesh orientations. For example, the mesh may be substantially open wherein yarns or groups of yarns are spaced from adjacent yarns or groups of yarns, or the mesh may be substantially closed wherein yarns or groups of yarns are in contact or nearly in contact with adjacent yarns or groups of yarns. In various embodiments, polyester yarns are interweaved with the aramid yarns to pad the aramid yarns from abrading each other. The polyester yarn limits the contact made between adjacent aramid yarn strands. Sleeve 514 is sized such that an inner radius of sleeve 514 is substantially equal to an outer radius of core tube 502 when a predetermined amount of pressure is contained within core tube 502. In the exemplary embodiment, when core tube 502 contains fluid at approximately 500 psig, the outer diameter of core tube 502 is approximately equal to the inner diameter of sleeve 514. At such pressure an inner surface of sleeve 514 is fully engaged with outer surface 512 to facilitate limiting further radial expansion of core tube 502. Sleeve 514 provides reinforcement to permit a working pressure within core tube 502 of greater than 500 psig.

A second aramid sleeve 516 also including aramid yarn is positioned over sleeve 514. Second aramid sleeve 516 circumferentially covers sleeve 514. In the exemplary embodiment, the construction of sleeve 516 is substantially similar to the construction of sleeve 514. In an alternative embodiment, the construction of sleeve 516 is different than the construction of sleeve 514. Sleeve 516 is sized such that an inner radius of sleeve 516 is substantially equal to an outer radius of sleeve 514 when a predetermined amount of pressure is contained within core tube 502. In the exemplary embodiment, when core tube 502 contains fluid at approximately 500 psig, the outer diameter of sleeve 514 is approximately equal to the inner diameter of sleeve 516. At such pressure an inner surface of sleeve 516 is fully engaged with the outer surface of sleeve 514 to facilitate limiting further radial expansion of core tube 502. Sleeve 516 provides reinforcement to permit a working pressure within core tube 502 of greater than 500 psig.

A polyester layer 518 at least partially covers second aramid sleeve 516 to facilitate providing abrasion resistance to the aramid sleeves 514 and 516. In the exemplary embodiment, polyester layer 518 includes a top coat layer 520 configured to facilitate making the polyester layer substantially impervious to liquid intrusion and to ultraviolet light, which may adversely affect the aramid yarns in sleeves 514 and 516. As fully assembled, hose 500 permits a working pressure within core tube 502 of approximately 2250 psig.

Figure 6:
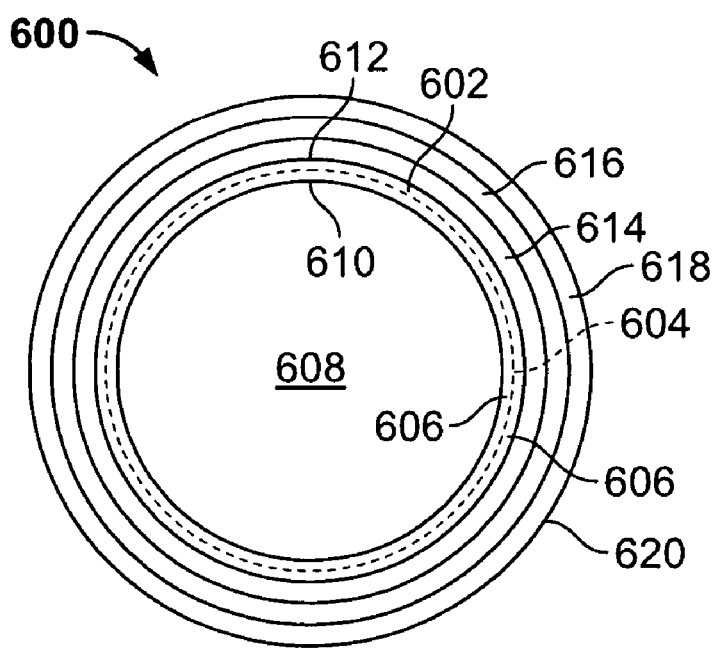
FIG. 6 is a cross-sectional view of an exemplary fluid transfer conduit in accordance with another embodiment of the present invention.

FIG. 6 is a cross-sectional view of an exemplary fluid transfer conduit 600 in accordance with another embodiment of the present invention. Fluid transfer conduit or hose 600 includes a core tube 602 that includes a polyester reinforcing sleeve 604 that is co-extruded with a material that is substantially impervious to fuels, such as hydrocarbon fuels, for example, urethane 606. Core tube 602 is formed as an elongate cylindrical hose configured to maintain a substantially flat cross-section when substantially empty of fluid within a central bore 608 of core tube 602 and a substantially circular cross-section when at least partially filled with a fluid. Optionally, core tube 602 is formed to maintain a circular or elliptical cross-section when empty. Core tube 602 is formed to include an inner surface 610 that has a coefficient of fluid friction substantially similar to smooth-bore pipe and a radially outer surface 612.

Core tube 602 is capable of resisting a pressure of up to approximately 500 psig without further reinforcement. An aramid sleeve 614 including aramid yarn arranged in interlocking engagement, such as by weaving, is position over core tube 602 circumferentially covering outer surface 612. In the exemplary embodiment, the aramid yarn is fabricated of substantially continuous length multi-filament extruded yarns and is woven such that circumferential weft yarns are interleaved with longitudinal warp yarns. In an alternative embodiment, the aramid yarns are woven in other interleaved patterns. The weave may be configured in various selectable mesh orientations. For example, the mesh may be substantially open wherein yarns or groups of yarns are spaced from adjacent yarns or groups of yarns, or the mesh may be substantially closed wherein yarns or groups of yarns are in contact or nearly in contact with adjacent yarns or groups of yarns. In various embodiments, polyester yarns are interweaved with the aramid yarns to pad the aramid yarns from abrading each other. The polyester yarn limits the contact made between adjacent aramid yarn strands. Sleeve 614 is sized such that an inner radius of sleeve 614 is substantially equal to an outer radius of core tube 602 when a predetermined amount of pressure is contained within core tube 602. In the exemplary embodiment, when core tube 602 contains fluid at approximately 500 psig, the outer diameter of core tube 602 is approximately equal to the inner diameter of sleeve 614. At such pressure an inner surface of sleeve 614 is fully engaged with outer surface 612 to facilitate limiting further radial expansion of core tube 602. Sleeve 614 provides reinforcement to permit a working pressure within core tube 602 of greater than 500 psig.

A second aramid sleeve 616 also including aramid yarn is positioned over sleeve 614. Second aramid sleeve 616 at least partially covers sleeve 614. In the exemplary embodiment, the construction of sleeve 616 is substantially similar to the construction of sleeve 614. In an alternative embodiment, the construction of sleeve 616 is different than the construction of sleeve 614. Sleeve 616 is sized such that an inner radius of sleeve 616 is substantially equal to an outer radius of sleeve 614 when a predetermined amount of pressure is contained within core tube 602. In the exemplary embodiment, when core tube 602 contains fluid at approximately 500 psig, the outer diameter of sleeve 614 is approximately equal to the inner diameter of sleeve 616. At such pressure an inner surface of sleeve 616 is fully engaged with the outer surface of sleeve 614 to facilitate limiting further radial expansion of core tube 602. Sleeve 616 provides reinforcement to permit a working pressure within core tube 602 of greater than 500 psig.

A polyester layer 618 at least partially covers second aramid sleeve 616 to facilitate providing abrasion resistance to the aramid sleeves 614 and 616. In the exemplary embodiment, polyester layer 618 includes a top coat layer 620 configured to facilitate making the polyester layer substantially impervious to liquid intrusion and to ultraviolet light, which adversely affect the aramid yarns in sleeves 614 and 616. As fully assembled, hose 600 permits a burst pressure within core tube 602 of approximately 2250 psig.

Examples of exemplary fluid transfer conduits are described above having one or two aramid sleeves. The above descriptions are exemplary only and additional aramid sleeves are contemplated as well as intermediate layers and or sleeves positioned between the aramid sleeves. Such intermediate layers and/or sleeves may add padding between aramid sleeves, imperviousness to materials, fluids, and/or radiation.

Figure 7:
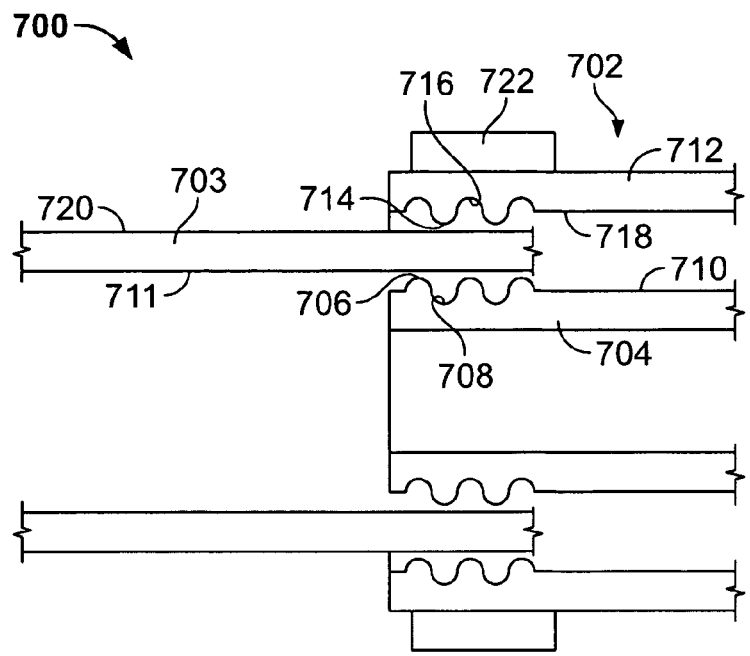
FIG. 7 is a schematic view of an exemplary conduit system including a coupling assembly coupled to a fluid transfer conduit.

FIG. 7 is a schematic view of an exemplary conduit system 700 including a coupling assembly 702 coupled to conduit 703. Coupling assembly 702 includes an inner coupling end 704 that includes one or more ridges 706, grooves 708, or combinations thereof that extend circumferentially about an exterior surface 710 of inner coupling end 704. Exterior surface 710 is configured to engage an inner surface 711 of conduit 703.

Coupling assembly 702 includes an outer sleeve end 712 that includes one or more ridges 714, grooves 716, or combinations thereof that extend circumferentially about an interior surface 718 of outer sleeve end 712. Interior surface 718 is configured to engage top-coat layer 720. A clamp member 722 is configured to draw inner coupling end 704 and outer sleeve end 712 together when at least a portion of conduit 703 is positioned between inner coupling end 704 and outer sleeve end 712 such that ridges 706 and 714, and grooves 708 and 716 mesh with compressible engagement with conduit 703 to form an interference fit with the portion of conduit 703.

Figure 8:
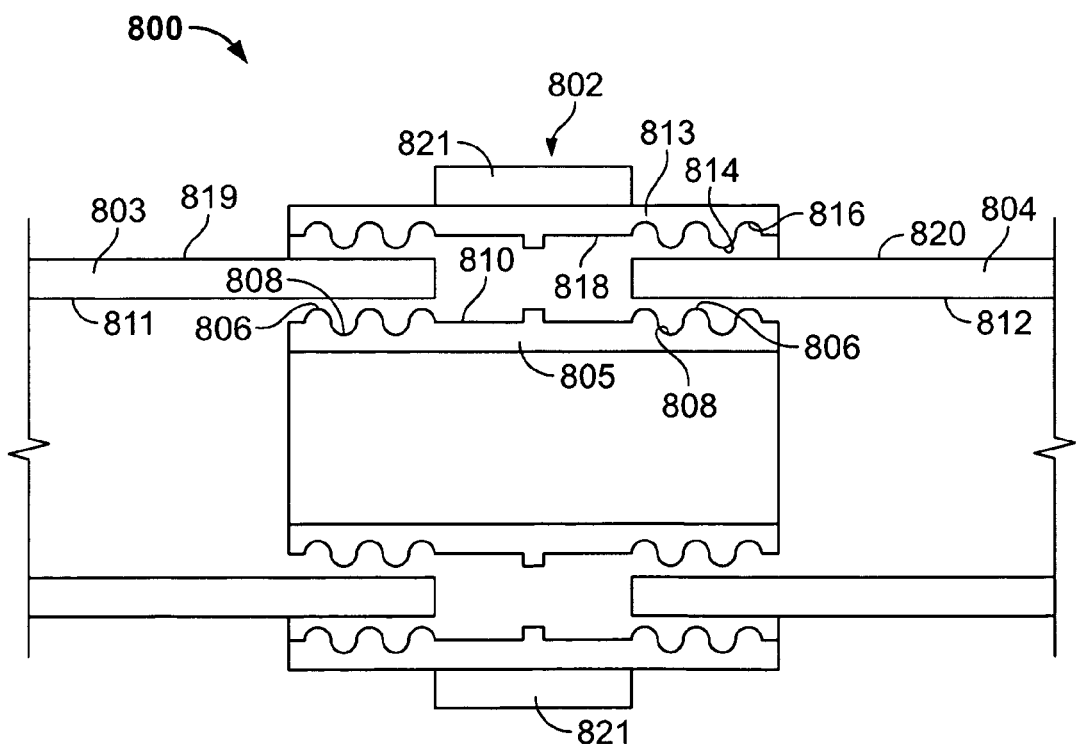
FIG. 8 is a schematic view of an exemplary conduit system including a splice assembly coupled to a fluid transfer conduit.

FIG. 8 is a schematic view of an exemplary conduit system 800 including a splice assembly 802 coupled to a first conduit 803 and a second conduit 804. Coupling assembly 802 includes an inner splice end 805 that includes one or more ridges 806, grooves 808, or combinations thereof that extend circumferentially about an exterior surface 810 of inner splice end 805. In the exemplary embodiment, inner splice end 805 is configured similarly to two inner coupling ends 704 (shown in FIG. 7) coupled back to back such that ridges 806 and grooves 808 on each end of inner splice end 805 are oriented away from each other. Exterior surface 810 is configured to engage an inner surface 811 of conduit 803 and an inner surface 812 of conduit 804.

Coupling assembly 802 includes an outer sleeve end 813 that includes one or more ridges 814, grooves 816, or combinations thereof that extend circumferentially about an interior surface 818 of outer sleeve end 813. Interior surface 818 is configured to engage an outer surface 819 of conduit 803 and an outer surface 820 of conduit 804. A clamp member 821 is configured to draw inner splice end 805 and outer sleeve end 813 together when at least a portion of conduits 803 and 804 are positioned between inner splice end 805 and outer sleeve end 813 such that ridges 806 and 814, and grooves 808 and 816 mesh with compressible engagement with conduits 803 and 804 to form an interference fit with the portion of first conduit 803 and second conduit 804.

Although the embodiments described herein are discussed with respect to a fuel transport system, it is understood that the hose assemblies, couplings, and splices described herein may be used with other fluids such as water, gases, and slurries.

It will be appreciated that the use of first and second or other similar nomenclature for denoting similar items is not intended to specify or imply any particular order unless otherwise stated.

The above-described embodiments of a fluid transport system provide a cost-effective and reliable means for transporting substantial volumes of, for example, fuel, water, gases, and slurries under high pressure over rough terrain and harsh environments. Specifically, the reinforced core tube and aramid yarn reinforcement provide a significant pressure resisting hose and the top-coated polyester cover provides abrasion and ultraviolet light protection to the hose materials.

Exemplary embodiments of fluid transport systems and apparatus are described above in detail. The fluid transport system components illustrated are not limited to the specific embodiments described herein, but rather, components of each system may be utilized independently and separately from other components described herein. For example, the fluid transport system components described above may also be used in combination with different fluid transport system components.

While the invention has been described in terms of various specific embodiments, those skilled in the art will recognize that the invention can be practiced with modification within the spirit and scope of the claims.

What is claimed is:

1. A flexible hose assembly comprising:
a core tube comprising a woven reinforced sleeve that is extruded with a material that is substantially fluid-impervious to form a body comprising an inner surface and an outer surface; and
an aramid sleeve comprising aramid yarn and a different second yarn interwoven with said aramid yarn such that the second yarn pads the aramid yarn, said aramid sleeve circumferentially covering the core tube.

2. An assembly in accordance with claim 1 wherein said material extruded with said woven reinforced sleeve is substantially impervious to a fuel between said inner surface and said outer surface.

3. An assembly in accordance with claim 2 wherein said fuel comprises a hydrogen carbon base.

4. An assembly in accordance with claim 1 further comprising at least a second aramid sleeve comprising aramid yarn, said at least a second aramid sleeve circumferentially covering the aramid sleeve, said second aramid sleeve being movable relative to said first aramid sleeve when said core tube is empty.

5. An assembly in accordance with claim 1 further comprising a polyester layer circumferentially covering said aramid sleeve.

6. An assembly in accordance with claim 5 wherein said polyester layer comprises a topcoat configured to facilitate making the polyester layer substantially impervious to at least one of liquid intrusion and ultraviolet light.

7. An assembly in accordance with claim 1 wherein said woven sleeve constitutes a polyester reinforcing sleeve co-extruded with urethane as said substantially fluid impervious material.

8. An assembly in accordance with claim 1 wherein said core tube is configured to maintain a substantially flat cross-section when empty and a substantially circular cross-section when at least partially filled with a fluid.

9. An assembly in accordance with claim 1 wherein each aramid sleeve comprising aramid yarn comprises circumferentially wound yarns interwoven with substantially longitudinally oriented yarns.

10. An assembly in accordance with claim 1 wherein each said aramid sleeve comprising aramid yarn comprises substantially continuous length multi-filament extruded yarns.

11. An assembly in accordance with claim 1 wherein said second yarn comprises polyester yarns interwoven with said aramid such that the polyester yarns pad the aramid yarns.

12. An assembly in accordance with claim 1 wherein said inner surface comprises a fluid friction coefficient having a value that is substantially similar to a fluid friction coefficient of a smooth-bore pipe.

13. An assembly in accordance with claim 1 wherein said core tube is capable of resisting pressure up to approximately 500 psig.

14. An assembly in accordance with claim 1 wherein said flexible hose assembly is capable of resisting pressure up to approximately 2250 psig.

* * * * *